United States Patent
Wirth et al.

[11] Patent Number: 6,047,592
[45] Date of Patent: Apr. 11, 2000

[54] FOUR-STROKE INTERNAL COMBUSTION ENGINE WITH SPARK IGNITION

[75] Inventors: Martin Wirth, Mayersdorf; Walter Piock, Niederberg, both of Austria

[73] Assignee: AVL List GmbH, Graz, Austria

[21] Appl. No.: 08/829,315

[22] Filed: Mar. 31, 1997

[30] Foreign Application Priority Data

Apr. 1, 1996 [AT] Austria ................................. 181/96 U
Aug. 30, 1996 [AT] Austria ................................. 505/96 U

[51] Int. Cl.[7] ................................................ F02B 3/04
[52] U.S. Cl. .............................. 73/116; 123/307; 123/661
[58] Field of Search ................................ 73/116, 117.2, 73/117.3, 118.1; 123/262, 269, 280, 285, 294, 295, 301, 307, 659, 661, 667, 674, 675, 679

[56] References Cited

U.S. PATENT DOCUMENTS

| | | | |
|---|---|---|---|
| 4,162,661 | 7/1979 | Nakanishi et al. | 123/30 C |
| 4,221,190 | 9/1980 | Komiyama et al. | 123/263 |
| 4,296,720 | 10/1981 | Nakanishi et al. | 123/661 |
| 4,543,929 | 10/1985 | Kataoka et al. | 123/263 |
| 4,617,888 | 10/1986 | Dent | 123/307 |
| 4,788,942 | 12/1988 | Pouring et al. | 123/26 |
| 4,951,642 | 8/1990 | Hashimoto et al. | 123/661 |
| 5,237,973 | 8/1993 | Oda | 123/432 |
| 5,720,253 | 2/1998 | Matoba et al. | 123/298 |
| 5,771,872 | 6/1998 | Ueda et al. | 123/661 |
| 5,873,344 | 2/1999 | Kudou eta l. | 123/295 |
| 5,921,215 | 7/1999 | Wirth et al. | 123/307 |

FOREIGN PATENT DOCUMENTS

| | | |
|---|---|---|
| 0412008 | 2/1991 | European Pat. Off. . |
| 0558072 | 9/1993 | European Pat. Off. . |
| 0639703 | 2/1995 | European Pat. Off. . |
| 2308700 | 8/1973 | Germany . |

OTHER PUBLICATIONS

SAE Paper No. 940188 by Lawrence W. Evers, "Characterization of the Transient Spary from a High Pressure Swirl Injector.".

*Primary Examiner*—George Dombroske
*Attorney, Agent, or Firm*—Watson Cole Grindle Watson, P.L.L.C.

[57] ABSTRACT

In order to optimize combustion in a four-stroke spark-ignition engine with direct fuel injection, the conditions of charge flow are improved by providing the top surface of each piston with two longitudinal guiding ribs located at a distance from each other and a cross-guiding rib running transversely thereto, thus providing an H-shaped configuration.

20 Claims, 4 Drawing Sheets

6,047,592

FOUR-STROKE INTERNAL COMBUSTION ENGINE WITH SPARK IGNITION

BACKGROUND OF THE INVENTION

The present invention relates to a four-stroke internal combustion engine with spark ignition and direct injection of the fuel into the combustion chamber, with a reciprocating piston for each cylinder and a roof-shaped top of the combustion chamber with two or more intake valves as well as intake ports generating a tumble flow in the combustion chamber and arranged on one side of the longitudinal center plane of the engine defined by the axes of crankshaft and cylinder, as well as a fuel injection device located on the intake side between the intake ports and directed towards the center of the cylinder, and an ignition source located in the area of the cylinder axis in the roof of the combustion chamber.

DESCRIPTION OF THE PRIOR ART

Ever stricter demands concerning the reduction of fuel consumption and exhaust emissions, in particular hydrocarbon and nitrogen oxide emissions, necessitate the use of new technologies in internal combustion engines, above all in engines of the spark-ignition type that are predominant in the automobile industry.

One of the main reasons why the specific fuel consumption of a spark-ignition engine is higher than that of a diesel engine is that the spark-ignition engine operates on a premixed, homogeneous fuel-air mixture. This requires control of the engine load by means of a throttling element limiting the total intake of fuel-air mixture (regulation by quantity).

Throttling the intake flow leads to a thermodynamic loss, which will increase fuel consumption of the engine. If such throttling is avoided, potential fuel savings amount to an estimated 25 percent.

Full use of the fuel saving potential is made possible by direct fuel injection and largely unthrottled engine operation, such that a spark-ignition engine may be operated in a manner similar to a diesel engine, using regulation by quality, i.e., control of the engine load by variation of the fuel-air ratio.

This mode of operation demands specific measures to safeguard complete and stable combustion even with a very high proportion of air in the mixture (low engine load), i.e., when a homogeneous fuel-air mixture is no longer ignitible.

This problem is commonly solved by providing for a strongly stratified, i.e., inhomogeneous, distribution of the mixture, which may be advantageously attained in the instance of direct fuel injection by injecting the fuel just before ignition takes place.

The mixture stratification thus generated by direct fuel injection must be stabilized by the main flow structures in the cylinder space of the internal combustion engine and by the geometry of the combustion chamber, in order to outlast the time-span between the end of injection and the beginning of ignition, even in the presence of the typically high turbulence levels of the internal flow. Main flow forms in this context are swirl and tumble movements. In the instance of a swirl movement the cylinder charge rotates about the cylinder axis due to the specific design of the intake passage, whereas a tumble flow is characterized by the charge rotating about an axis parallel to the crankshaft.

An intake-generated tumble vortex exhibits accelerated rotation due to a reduction of the cross-sectional area during compression. On the other hand the tumble flow is somewhat less stable than a swirl flow rotating about the cylinder axis, with a tendency to divide into more complex secondary vortices. In the final phase of compression strong disintegration of the tumble vortex into smaller, stochastically distributed vortices may be observed if the valve angle (of a typical four-valve combustion chamber) is sufficiently flat. A tumble flow may be generated in the cylinder space of a modern, multivalve, spark-ignition engine with 2 or 3 intake valves without risking significant reductions in the flow coefficients of the intake ports. As a consequence, tumble flows are frequently used flow designs for spark-ignition engines in which the combustion characteristics are to be improved by means of increased charge movement.

For the delivery of fuel into the combustion chamber under the above flow conditions an injection valve is presented in SAE Paper 940188, which produces a cone-shaped injection jet with excellent fuel atomization. By changing the fuel pressure and the counterpressure in the combustion chamber, the angle of the injected spraycone may be influenced. A typical property of such injection nozzles is the improvement of atomization quality with rising injection pressure. This desired dependence will lead to increasing velocities of the injection jet of up to 100 m/s, however, accompanied by a high momentum of the fuel spray entering the combustion chamber. By contrast, the air flow in the combustion chamber, even in the presence of strong intake-generated swirl or tumble movements, exhibits a far smaller momentum (not more than 30–40 m/s), such that the injection jet in a first phase of entrance into the combustion chamber is only slightly influenced by the flow movements prevailing therein.

In view of the above considerations the main task to be accomplished is to transform the injection jet into a locally concentrated fuel-air spraycloud, which must be advanced from the nozzle of the injection valve to the spark plug, and to further mix the mixture inside this cloud with the air in the combustion chamber. In this context the following points are essential:

The fuel-air spray must maintain its compact shape, especially at low engine loads, and should possibly be kept in the center of the combustion chamber, for thermodynamical reasons and in order to reduce the emissions of unburnt hydrocarbons.

Evaporation of the injected fuel and its mixing with the air in the combustion chamber to a preferably stoichiometric air ratio must be effected in the comparatively short time span between injection and ignition.

At the spark plug there should prevail a low mean flow velocity, together with a high turbulence level, to promote ignition of the fuel-air spray by the spark.

In developing a suitable combustion process for a spark-ignition engine with direct fuel injection, the particular dimensions of the combustion chamber must be taken into account as well as the characteristics of injection jet propagation. In an automobile engine of the spark-ignition type typical volumes of the individual cylinders lead to bore diameters of 60–100 mm, the piston lift approximately being in the same order of magnitude.

In view of the above propagation velocities of the injection jet at least part of the fuel spray is expected to hit the surface of the piston. For this reason the design of the flow movements inside the combustion chamber should take into account this wetting of the walls.

In shaping the spraycloud and preparing the fuel-air mixture the following effects may be utilized:

deflection of the high momentum of the injection jet towards the spark plug by means of the piston surface, high injection pressure to improve atomization, thus accelerating direct evaporation of the fuel spray before it reaches the wall, generation of a higher turbulence level in the area of the injection jet by means of the flow movements inside the combustion chamber, acceleration of wall film evaporation by generating a high flow velocity in the wetted area of the piston surface.

EP 0 558 072 A1 is concerned with an engine design in which the intake ports are shaped and arranged such that a reverse tumble movement of the flow inside the combustion chamber is generated. This movement is amplified by adding a ramp-shaped projection to the surface of the piston. The piston surface also serves to deflect the injection jet towards the spark plug which is located in the cylinder center. In this way the injection jet and the flow in the combustion chamber pass along the piston surface in the same direction. The injection jet, or rather, the fuel-air spray into which the jet is transformed after its deflection at the piston, is permitted to propagate in all directions almost unimpeded, however, after having reached the cylinder head wall in the vicinity of the spark plug. No efforts are made at compacting the spraycloud after its deflection at the piston. Furthermore, the ramp-shaped projection on the piston surface produces a compression face underneath the exhaust valves. As a consequence, an additional, desirable, flow movement is created during engine compression just before the upper dead center, which is reversed, however, on the return move, thus tearing apart the compact mixture built up during the compression stroke.

Another variant of an internal combustion engine with direct fuel injection in presented in EP 0 639 703 A1, in which the intake ports are shaped such that a swirl flow is generated in the cylinder space. The piston surface has a clearly defined recess surrounded by a compression face, the recess being positioned eccentrically such that the spark plug in the center of the combustion chamber and the radially positioned injection valve are located at the edge of the recess. Fuel injection is directed towards the edge of the recess which is specifically designed for this purpose. In this instance the surface of the piston is primarily employed for atomization of the fuel jet. The task of the swirl flow is to push the atomized fuel rebounding from the edge of the recess towards the spark plug.

If we assume that the principal unit of a spark-ignition engine with direct fuel injection is an aggregate with two or more intake valves per combustion chamber for optimum cylinder charging, one main problem in designing the combustion process is presented by the arrangement of the components, since both spark plug and injection nozzle must be accommodated in the cylinder head, the two having about the same dimensions.

To ensure reliable ignition and stable combustion the injection nozzle was frequently placed in close vicinity of the spark plug in previous arrangements. Placing the injection nozzle next to the spark plug will inevitably reduce valve diameters, however, thus leading to undesirable performance losses. If the optimized valve diameters realized in multivalve spark-ignition engines are to be maintained, the only suitable location for the injection nozzle is between the valves near the cylinder wall, the position between the intake valves appearing to be especially advantageous for thermal reasons. This arrangement has been given preference in the state of the art configurations referred to above.

Positioning the injection nozzle at a comparatively large distance from the spark plug which is preferably placed in the center of the combustion chamber, will make high demands on the combustion process. The fuel jet must travel a good distance from the nozzle to the ignition location, which is accompanied by a greater time lapse between injection and ignition. In view of the generally high turbulence level in the combustion chamber the two factors will render it more difficult to maintain a compact fuel-air spraycloud with small cyclical fluctuations, which is indispensable for attaining a stable and accurately replicable combustion process in each engine cycle.

Repetitive accuracy of the spatial propagation process may be significantly improved if the flow movement inside the cylinder has an ordered structure of high stability throughout the compression phase.

SUMMARY OF THE INVENTION

It is an object of this invention to avoid the above drawbacks and to favorably influence the charge flow inside the combustion chamber so as to permit optimum combustion under the above conditions and based on the principal assumption of an intake-generated tumble flow prevailing in the cylinder space of the internal combustion engine, with special emphasis on the following tasks:

assisting in forming a basic tumble flow during the suction phase, efficient transformation of the basic tumble flow into increased turbulence during the late compression phase, deflection of the injection jet towards the spark plug, guiding of the fuel-air stream to minimize cyclical fluctuations in mixture distribution.

In the invention this is achieved by providing the piston on its top surface next to the combustion chamber with an H-shaped configuration of flow guiding ribs, of which two longitudinal ribs located at a distance from each other and the cylinder axis, are arranged transversely to the crankshaft axis, and a cross-rib runs between the longitudinal ribs, which is in parallel with the crankshaft axis in at least one point, the top face of the piston assuming a continuously curved, concave shape between the guiding ribs, i.e., preferably between the guiding ribs and the outer edge of the piston, and fuel injection being directed into one of the concave areas obtained in this manner. The cross-rib runs essentially parallel to the crankshaft axis.

This configuration will allow for the flow transformation typically occurring during compression, when the tumble vortex is transformed into two vortices rotating in opposite directions, whose rotational axes have a tendency to align themselves in parallel with the cylinder axis during the compression phase. This flow form, which is produced by a "tipover" of the tumble vortex rotating in parallel with the crankshaft axis, is also referred to as omega tumble. The air flow generated in this process sweeps along the piston top face from the intake to the exhaust side, and is directed upwards by the cross-rib in the central area of the cylinder. On the intake side a second vortex is formed by flow separation, which rotates in opposite direction. This flow is further increased by the top face of the piston, part of which lies below a reference plane through the outer edge of the piston, i.e., on the side facing the crankshaft.

To ensure flow separation of the air flow moving in parallel with the longitudinal ribs, the guiding ribs are advantageously provided with rounded upper edges, whose curved part is directly adjoined by the concave top face of the piston, the radius of the round part of the cross-rib preferably amounting to less than 2 mm, and the radius of the round part of each longitudinal rib preferably assuming the highest possible value, i.e., preferably 0.5 times the rib width, so that flow separation takes place only at the cross-rib. The radius of the round part of the cross-rib should be as small as possible.

By providing that the distance between the longitudinal ribs as measured in the area of the longitudinal center plane of the engine should be at least 0.4 times the piston diameter, and at most 0.9 times the piston diameter, and preferably 0.6 times the piston diameter, a flow can be created in the area outside of the longitudinal ribs where there is no cross-rib, which will flow undisturbed along the top face of the piston towards the intake side of the engine, where it is guided by the cylinder wall towards a central position where the injection jet enters the cylinder.

It is provided in a preferred variant that the cross-rib is positioned, at least predominantly, on the exhaust side, and that the distance between cross-rib and cylinder axis, as measured normally to the longitudinal center plane of the engine, is at most 0.2 times the piston diameter. On the other hand, it may be an advantage sometimes if the cross-rib is positioned, at least predominantly, on the intake side, and the distance between cross-rib and cylinder axis, as measured normally to the longitudinal center plane, is at most 0.25 times the piston diameter.

To safeguard reliable guiding of the injection jet it is an advantage if the cross-rib has a height over its entire length that is smaller than the greatest height of the longitudinal ribs.

To attain optimum guiding of the flow and the injection jet it is of further advantage if the longitudinal ribs have the greatest possible height, i.e., at least partly. This height is defined by the contour of the roof of the combustion chamber when the piston is in upper dead center, and by the necessary valve clearance. It is preferable that the region of the greatest height be on the side of the longitudinal center plane accommodating the injection device.

An optimum flow form is attained if the nozzle opening of the injection device located in the cylinder head has a radial distance from the cylinder axis of at least 0.3 times the piston diameter and at most 0.55 times the piston diameter.

The symmetry axis of the injection jet produced by the injection device encloses an angle with the longitudinal center plane of at least 30° and at most 70°, i.e., preferably 45°, and is directed towards the center of the cylinder. It may further be provided that the conical injection jet produced by the injection device have a cone angle β of at least 30° and at most 90°, i.e., preferably 60°.

In variants with three intake valves the injection device preferably is positioned between the central intake valve and an exterior intake valve, in order to produce the effect described by the invention.

BRIEF DESCRIPTION OF THE DRAWINGS

The invention will be further described with reference to the accompanying drawings, in which.

Parts of the same functions have the same reference numbers in all variants.

DESCRIPTION OF THE PREFERRED EMBODIMENTS

Figure 1:
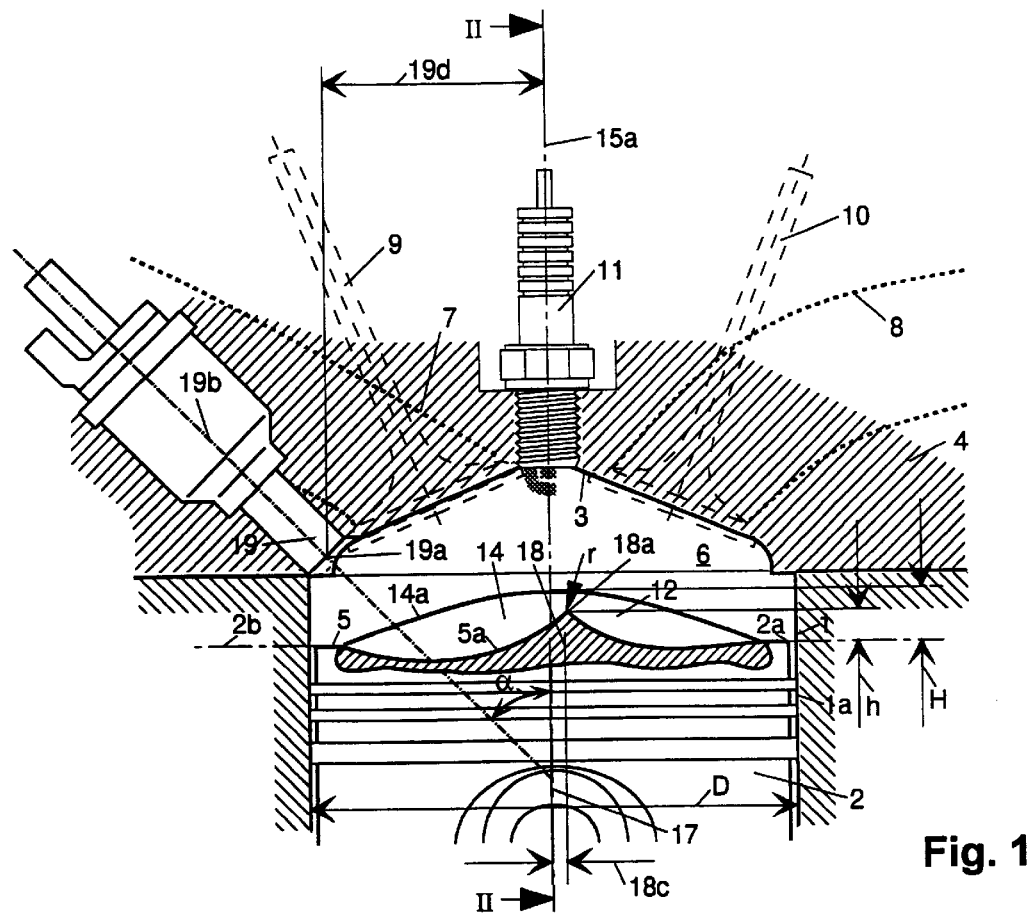
FIG. 1 is a cross-section through a four-stroke internal combustion engine in a first embodiment of the invention.

In a cylinder 1 of an internal combustion engine a reciprocating piston 2 is positioned so as to slide in longitudinal direction. The roof-shaped top 3 of the combustion chamber in the cylinder head 4 und the piston top face 5 of piston 2 form a combustion chamber 6 into which open two intake ports 7 and two exhaust ports 8, for example, which are indicated by dotted lines in FIG. 1. Corresponding intake and exhaust valves, which are in inclined position and are indicated by dashed lines, bear the reference numbers 9 and 10. 11 refers to a centrally positioned spark plug. Between the intake ports 7 an injection nozzle 19 is located for direct fuel injection into the combustion chamber 6. The piston diameter is marked D.

On the piston top face 5 the piston 2 is provided with a configuration of guiding ribs 12, which influence the tumble flow 13 inside the cylinder to optimize the combustion process. This influence is effected on the one hand by providing for a parallel movement of the tumble flow 13 when it is deflected at the piston top face 5, and on the other hand by deflecting or concentrating the fuel or fuel-air mixture in a partial area of the combustion chamber 6.

As is shown in the Figures, the guiding rib configuration 12 consists of two individual longitudinal ribs 14 which are positioned at a distance 14c of each other, and run through the cylinder axis 15a, symmetrically to a normal plane 16 on the crankshaft axis 15. In plan view, the upper edge 14a of each longitudinal rib has a tangent 14b which is parallel to the normal plane 16 at least in one point. By means of the longitudinal ribs 14 the formation of transverse components of the tumble flow upon deflection at the piston 2 is prevented.

In addition to the two longitudinal ribs 14 a cross-rib 18 is provided whose greatest distance from the longitudinal center plane 17 is referred to as 18c in the figures. In plan view, the upper edge 18a of each cross-rib 18 has a tangent 18b which is parallel to the longitudinal center plane 17 at least in one point. The cross-rib 18 combined with the longitudinal ribs 14 assists in imparting an upwards direction to the tumble flow 13 after its deflection at the piston 2, and will thus contribute to a further reduction in the formation of secondary structures and to an increase in rotational velocity of the tumble vortex 13 near upper dead center.

By positioning the cross-rib 18 close to the longitudinal center plane 17, the cross-rib 18 will contribute in transforming the tumble movement into turbulent fluctuations as the piston 2 approaches upper dead center.

The height H of the longitudinal ribs 14 above a reference plane 2b defined by the outer edge 2a of the piston, preferably assumes its greatest possible value, which is limited by the contour of the roof 3 when the piston 2 is in upper dead center, and by the necessary clearance of the valves 9, 10. The height h of the cross-rib 18 is smaller than the maximum height H of the longitudinal ribs 14.

The two longitudinal ribs 14 and the cross-rib 18 situated near the piston center are approximately arranged in the shape of an "H", if seen in the direction of the cylinder axis 15a.

Figure 2:
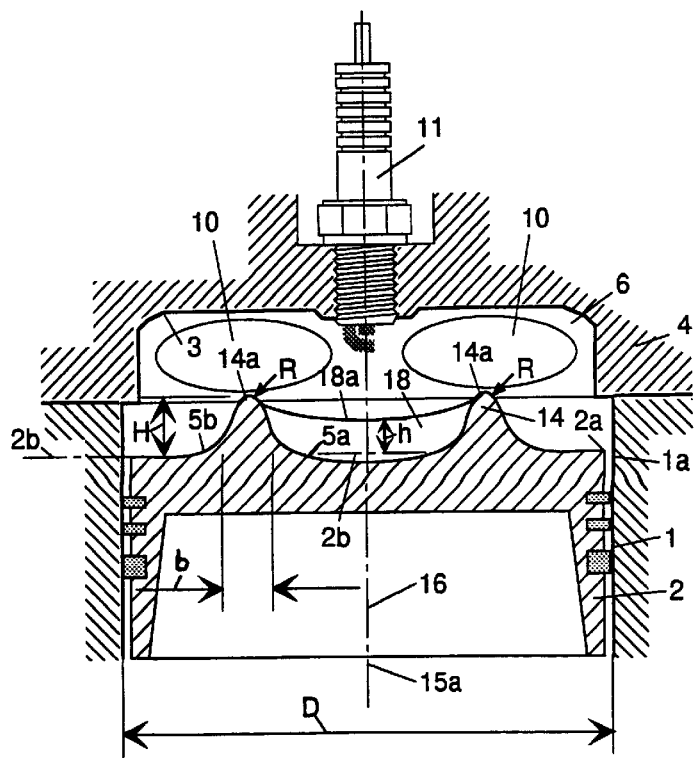
FIG. 2 is a section of the internal combustion engine along line II—II in FIG. 1.
Figure 3:
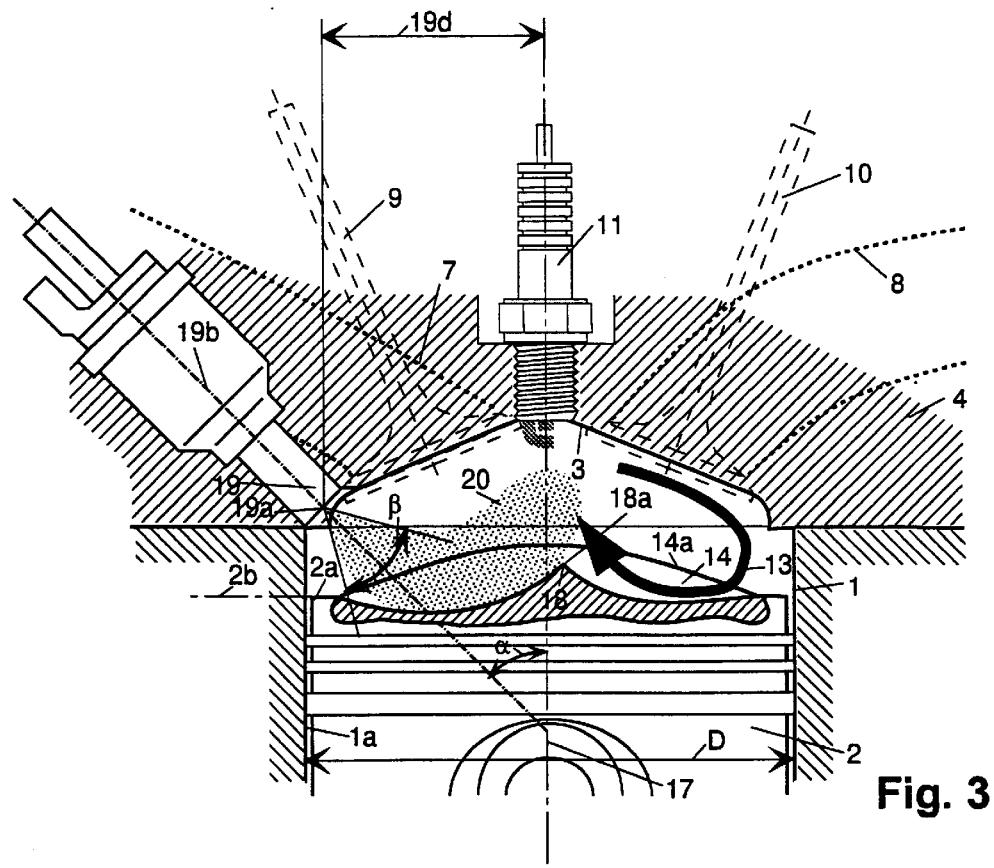
FIG. 3 shows the same engine during fuel injection, as a cross-section through the cylinder.
Figure 4:
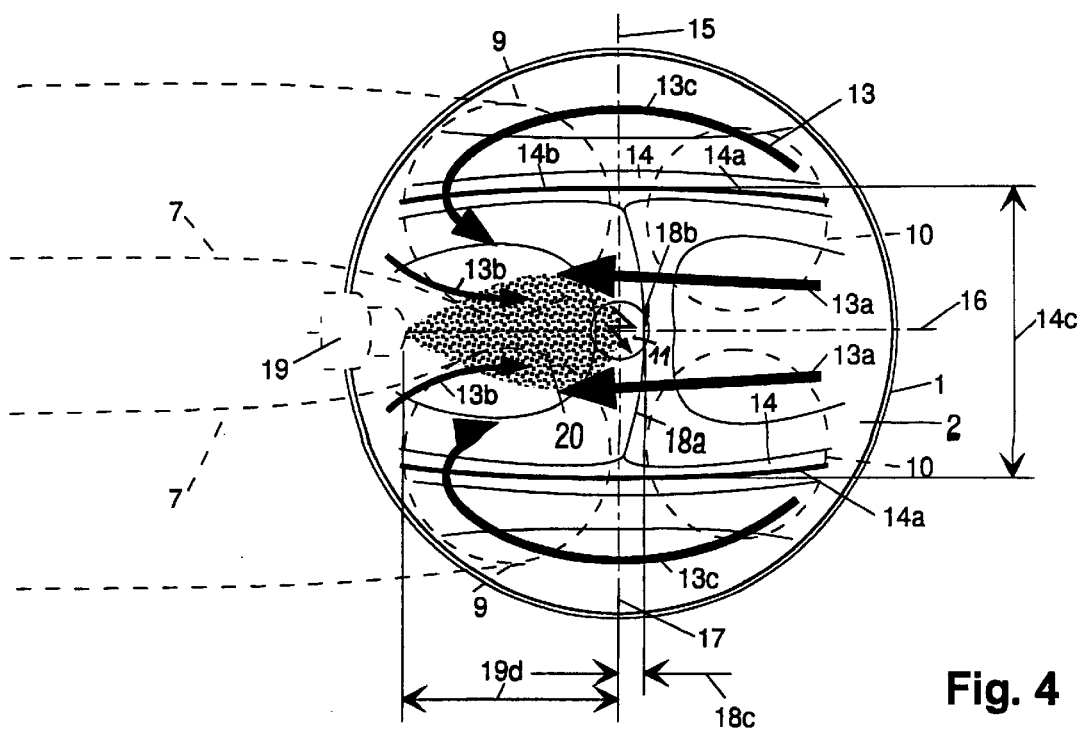
FIG. 4 shows the same engine during fuel injection, in a view in the direction of the cylinder axis.

As shown in FIG. 2, the piston top face 5a is continuously rounded and made concave between the longitudinal ribs 14 on either side of the cross-rib 18, and may be located, at least partly, below the reference plane 2b defined by the outer edge of the piston. On the outer sides of the longitudinal ribs 14 the piston top face 5b also is continuously rounded and may also be located, at least partly, below the reference plane 2b defined by the outer edge 2a of the piston. The upper edges 14a of the longitudinal ribs 14 are rounded with a radius R. The radius R preferably assumes the highest possible value, such as half the width b of the ribs, for example. The upper edge 18a of the cross-rib 18 preferably has a curvature radius r small enough to ensure flow separation of the air flow 13a sweeping the piston top face 5 from the intake to the exhaust side in parallel with the longitudinal ribs 14, which will result in an upwards direction of the flow in the central area of the cylinder 1 (FIG. 3). On the intake side a second vortex 13b rotating in opposite direction is created by flow separation, as is shown in FIG. 4. This vortex 13b is imparted a greater torque by the injection jet 19c entering the combustion chamber 6, which will result in the formation of an upwardly directed flow in the center of the combustion chamber and a stagnation point at the central spark plug 11. The symmetry axis 19b of the injection jet 19c encloses an angle α with the longitudinal center plane 17 of 30° to 60°. The cone angle β of the injection jet 19c is 30 to 90°, i.e., preferably 60°. The nozzle opening 19a is positioned at a distance 19d from the cylinder axis 15a, which amounts to 0.3 to 0.55 times the piston diameter D.

Since the area outside of the longitudinal ribs 14 does not exhibit a cross-rib, an undisturbed flow 13c of air towards the intake side of the engine is made possible along the piston top face 5, where it is guided by the cylinder wall 1a towards a central position where the injection jet 19c enters the cylinder. This flow corresponds to the omega tumble characteristic which is also observed in pistons with a plane top surface.

In the variant shown in FIGS. 1 to 4 the cross-rib 18 is positioned on the exhaust side and the longitudinal ribs 14 are approximately symmetrical with the longitudinal center plane 17.

Figure 5:
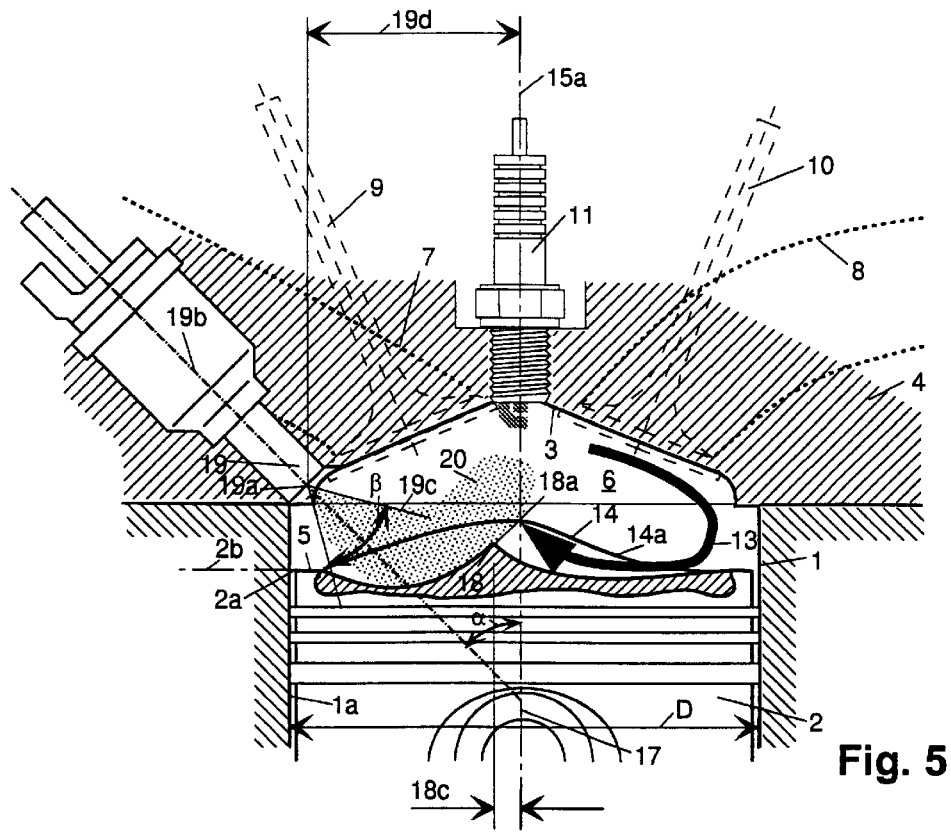
FIGS. 5 and 6 show a second and third variant of the invention.
Figure 6:
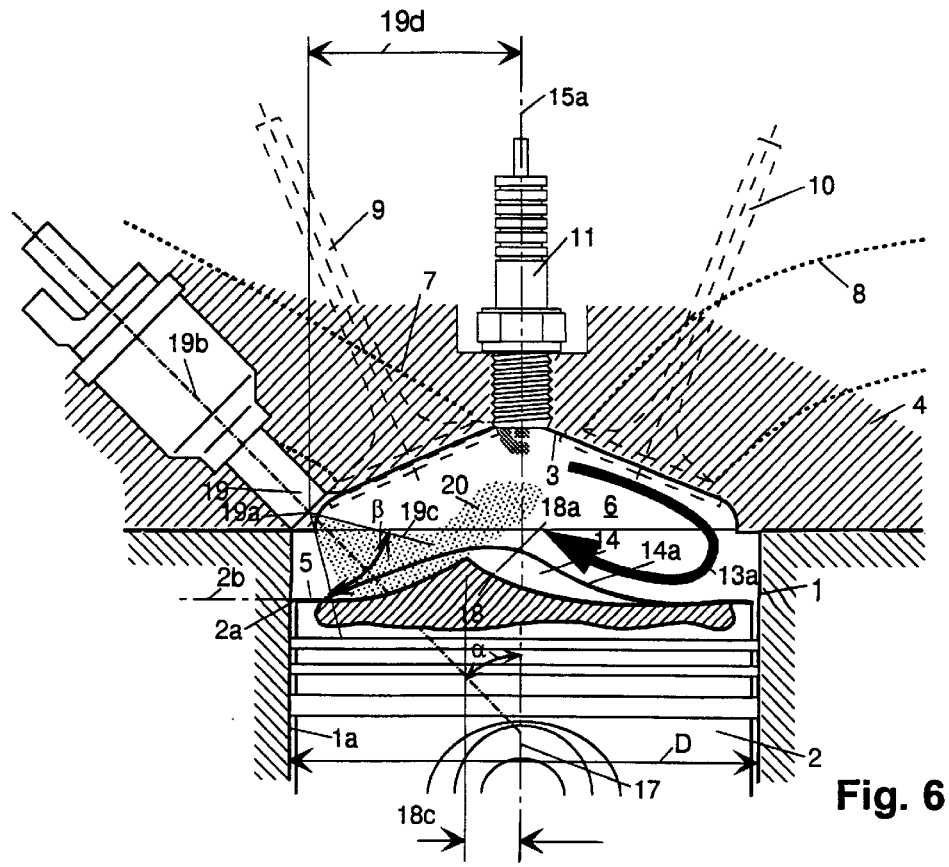

The shape and direction of the fuel-air spraycloud 20 may be substantially influenced by the position of the cross-rib 18. If, as shown in FIG. 5, the cross-rib 18 is located on the intake side, most of the fuel-air spray 20 will remain in the cylinder half on the intake side. If the piston top face 5a is given a flatter contour between the longitudinal ribs 14, i.e., with a greater curvature radius, the fuel-air spray 20 will also assume a flatter shape (see FIG. 6).

Figure 7:
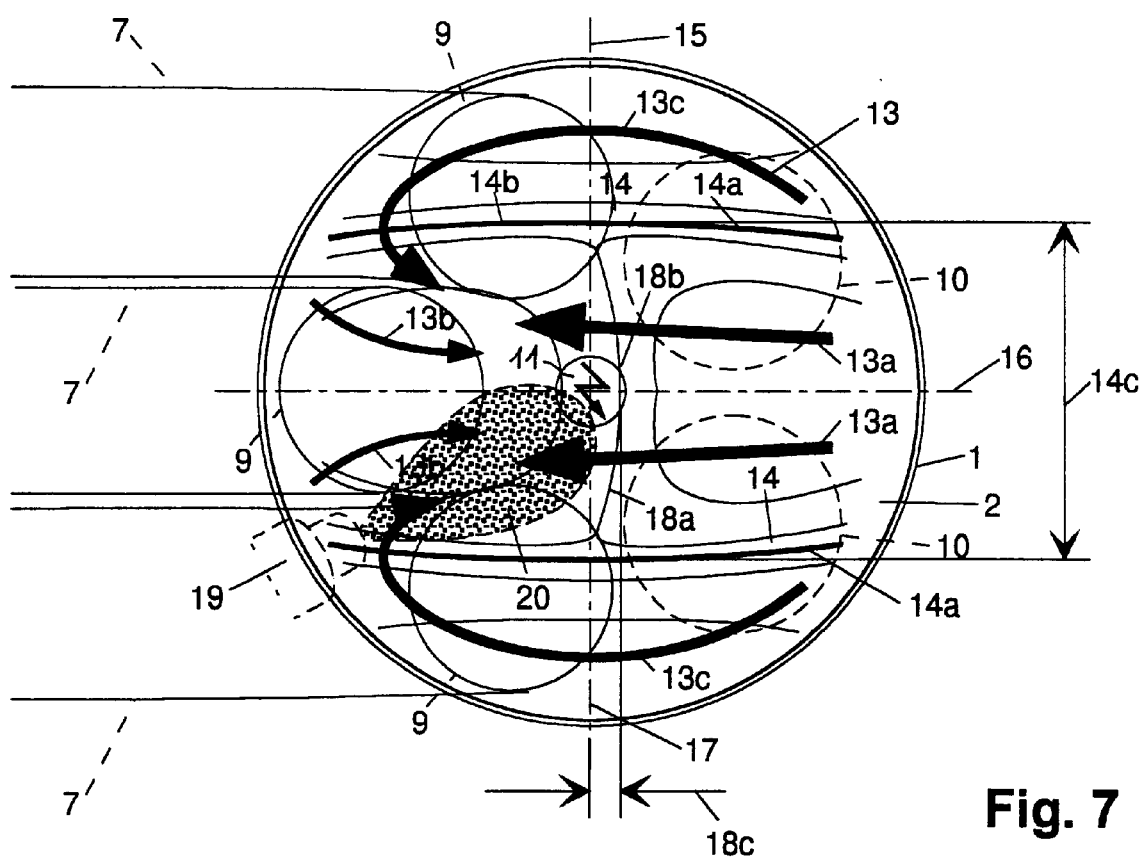
FIG. 7 shows a configuration of an internal combustion engine of the invention, with three intake valves.

The type of piston described by the invention may also be used in internal combustion engines with more than two intake valves 9. In such instances it will be useful if the injection nozzle 19 is positioned asymmetrically, i.e., between an exterior intake port and the central intake port 7, as is shown in FIG. 7.

We claim:

1. A four-stroke internal combustion engine with spark ignition and direct fuel injection into the combustion chamber, comprising:

a reciprocating piston per cylinder, and a roof-shaped combustion chamber top with two or more intake valves as well as intake ports generating a tumble flow in a combustion chamber and arranged on one side of a longitudinal center plane defined by a crankshaft axis and a cylinder axis, as well as a fuel injection device located on an intake side between the intake ports and directed towards a center of the cylinder, and an ignition source located in an area of the cylinder axis in a combustion chamber roof, wherein the piston is provided on its top surface next to the combustion chamber with an H-shaped configuration of flow guiding ribs, of which two longitudinal ribs located at a distance from each other and the cylinder axis, are arranged transversely to the crankshaft axis, and a cross-rib runs between the longitudinal ribs, which is in parallel with the crankshaft axis in at least one point, the piston top face assuming a continuously curved, concave shape between the guiding ribs, and fuel injection being directed into one of the concave areas obtained in this manner.

2. A four-stroke internal combustion engine as claimed in claim 1, wherein the piston face assumes a continuously curved, concave shape between the guiding ribs and a piston edge.

3. A four-stroke internal combustion engine as claimed in claim 1, wherein the piston top face is partly situated below a reference plane through the outer piston edge and on a side facing the crankshaft.

4. A four-stroke internal combustion engine as claimed in claim 1, wherein the guiding ribs are provided with rounded upper edges, whose curved part is directly adjoined by the concave top face of the piston.

5. A four-stroke internal combustion engine as claimed in claim 4, wherein the radius of the round part of the cross-rib amounts to less than 2 mm.

6. A four-stroke internal combustion engine as claimed in claim 4, wherein the radius of the round part of each longitudinal rib assumes the highest possible value.

7. A four-stroke internal combustion engine as claimed in claim 4, wherein the radius of the round part of each longitudinal rip amounts 0.5 times the rib width.

8. A four-stroke internal combustion engine as claimed in claim 1, wherein a distance between the longitudinal ribs as measured in the area of the longitudinal center plane is at least 0.4 times the piston diameter, and at most 0.9 times the piston diameter.

9. A four-stroke internal combustion engine as claimed in claim 1, wherein a distance between the longitudinal ribs as measured in the area of the longitudinal center plane is 0.6 times the piston diameter.

10. A four-stroke internal combustion engine as claimed in claim 1, wherein the cross-rib is positioned, at least predominantly, on an exhaust side, and a distance between cross-rib and cylinder axis, as measured normally to the longitudinal center plane, is at most 0.2 times the piston diameter.

11. A four-stroke internal combustion engine as claimed in claim 1, wherein the cross-rib is positioned, at least predominantly, on an intake side, and the distance between cross-rib and cylinder axis, as measured normally to the longitudinal center plane, is at most 0.25 times the piston diameter.

12. A four-stroke internal combustion engine as claimed in claim 1, wherein the cross-rib has a height over its entire length that is smaller than the greatest height of the longitudinal ribs.

13. A four-stroke internal combustion engine as claimed in claim 1, wherein a region of the longitudinal ribs has the greatest possible height, which height is defined by the contour of the combustion chamber roof when the piston is in upper dead center, and by the necessary clearance of the valves.

14. A four-stroke internal combustion engine as claimed in claim 13, wherein the region of the greatest height lies on the side of the longitudinal center plane accommodating the injection device.

15. A four-stroke internal combustion engine as claimed in claim 1, wherein a nozzle opening of the injection device located in the cylinder head has a radial distance from the cylinder axis of at least 0.3 times the piston diameter and at most 0.55 times the piston diameter.

16. A four-stroke internal combustion engine as claimed in claim 1, wherein a symmetry axis of an injection jet produced by the injection device encloses an angle with the longitudinal center plane of at least 30° and at most 70°, and is directed towards the center of the cylinder as seen in the direction of the cylinder axis.

17. A four-stroke internal combustion engine as claimed in claim 16, wherein the symmetry axis of the injection jet encloses an angle with the longitudinal center plane of 45°.

18. A four-stroke internal combustion engine as claimed in claim 1, wherein the conical injection jet produced by the injection device has a cone angle of at least 30° and at most 90°.

19. A four-stroke internal combustion engine as claimed in claim 18, wherein the conical injection jet has a cone angle of 60°.

20. A four-stroke internal combustion engine as claimed in claim 1, further comprising three intake valves, wherein the injection device is positioned between a central intake valve and an exterior intake valve.

* * * * *